United States Patent [19]

Fox et al.

[11] 4,258,577
[45] Mar. 31, 1981

[54] GYROSCOPIC APPARATUS

[75] Inventors: Colin H. J. Fox, Newcastle-upon-Tyne; James S. Burdess, Whitley Bay, both of England

[73] Assignee: National Research Development Corporation, London, England

[21] Appl. No.: 14,531

[22] Filed: Feb. 23, 1979

[30] Foreign Application Priority Data

Feb. 27, 1978 [GB] United Kingdom ............... 07702/78

[51] Int. Cl.³ ..................... G01C 19/28; G01C 19/56
[52] U.S. Cl. ................................. 74/5.6 R; 73/505;
73/517 AV; 74/5 R; 74/5.6 D
[58] Field of Search ............... 74/5.6 D, 5.6 R, 5 R;
73/495, 504, 505, 517 AV, 517 A

[56] References Cited

U.S. PATENT DOCUMENTS

| 3,270,566 | 9/1966 | Cenitch et al. | 74/5.6 D |
|---|---|---|---|
| 3,318,160 | 5/1967 | Erdley et al. | 74/5.4 |
| 3,382,726 | 5/1968 | Erdley | 74/5 R X |
| 3,394,597 | 7/1968 | Frohmberg et al. | 74/5.6 D |
| 3,463,016 | 8/1969 | Erdley et al. | 74/5.6 D X |
| 3,559,492 | 2/1971 | Erdley | 74/5.6 D X |

*Primary Examiner*—Rodney H. Bonck
*Attorney, Agent, or Firm*—Cushman, Darby & Cushman

[57] ABSTRACT

A gyroscope in which sprung elements are supported in cantilever fashion from a rotor and extend in a generally inward direction towards the rotor axis. The centers of mass of the elements are out of alignment with the rotor axis and the elements are free to vibrate in directions parallel to that axis. The output of the gyroscope is derived from detection of these vibrations.

9 Claims, 13 Drawing Figures

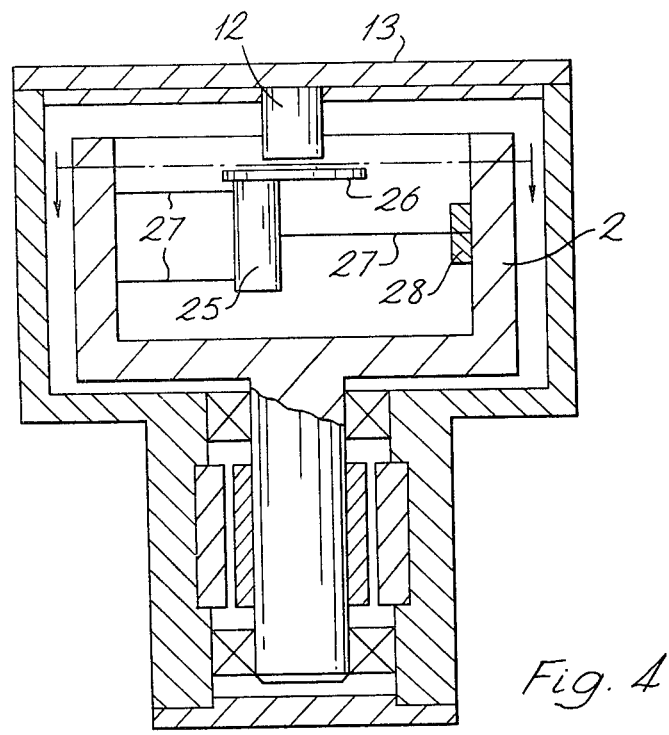
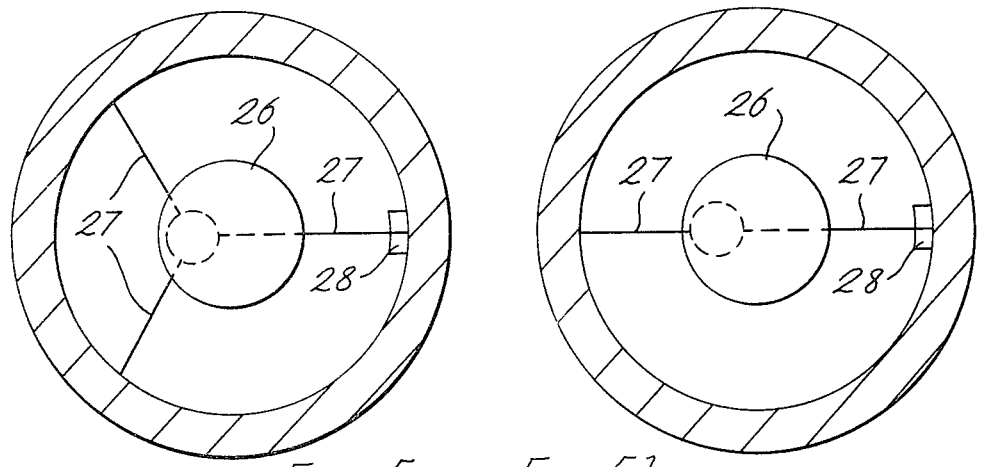
Fig. 4
Fig. 5a  Fig. 5b

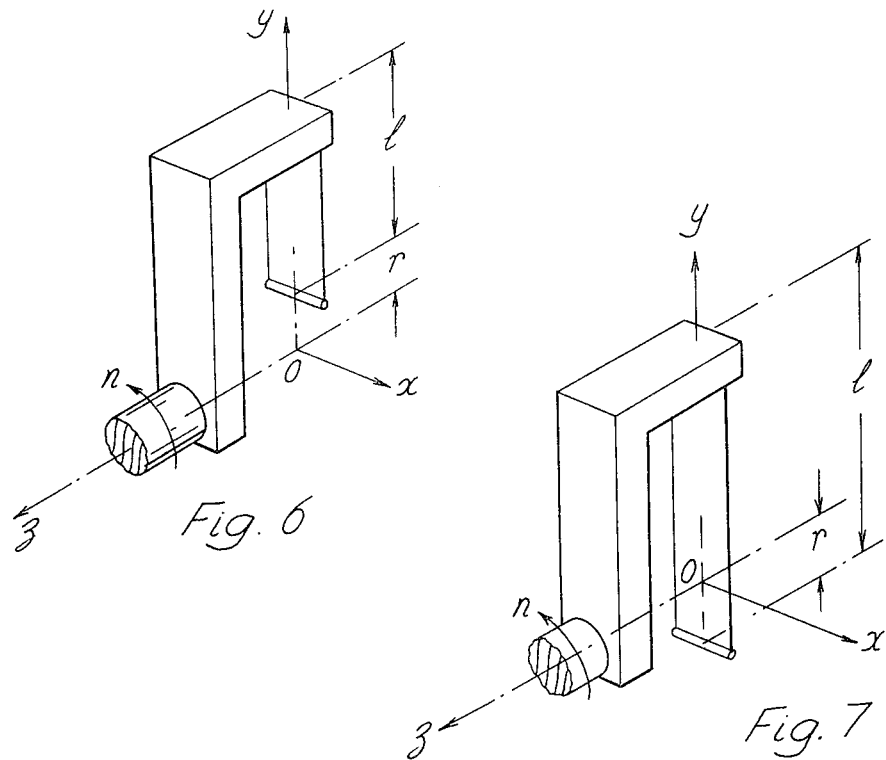
Fig. 6
Fig. 7
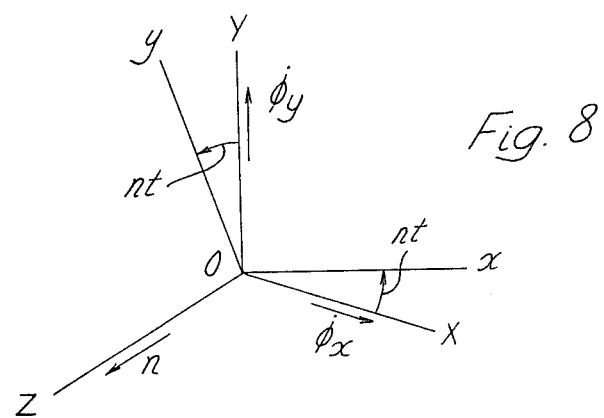
Fig. 8

GYROSCOPIC APPARATUS

This invention relates to gyroscopic apparatus, and in particular to a novel form of gimbal-less gyroscope, having characteristics suggesting that a "tuned" condition can be attained in which the gyro will be capable of acting as an angular displacement sensor. The invention arises from recent interest in elastically-supported gyroscopes, that is to say gyroscopes in which a sensitive element is elastically attached to the driving shaft or other means by which it is made to rotate. There are prospects that such instruments, potentially far less expensive than the well-known gyroscopes in which the rotor is fluid-supported, may yet offer acceptable performance. The gyroscope of the present invention is of particularly simple design and offers promise as a two-axis angular rate of displacement sensor, capable of simultaneously measuring linear acceleration along a third axis.

The invention is defined by the claims at the end of this specification and will now be described, by way of example, with reference to the accompanying drawings in which:

FIG. 4 is a diagrammatic axial section through another alternative apparatus;

FIGS. 5a and 5b are sections on the line X—X in FIG. 4 and show two alternative arrangements of the sensitive element and its support;

FIGS. 6 and 7 are schematic views indicating some axes and other relevant quantities.

FIG. 8 is an axis diagram, and

Figure 1:
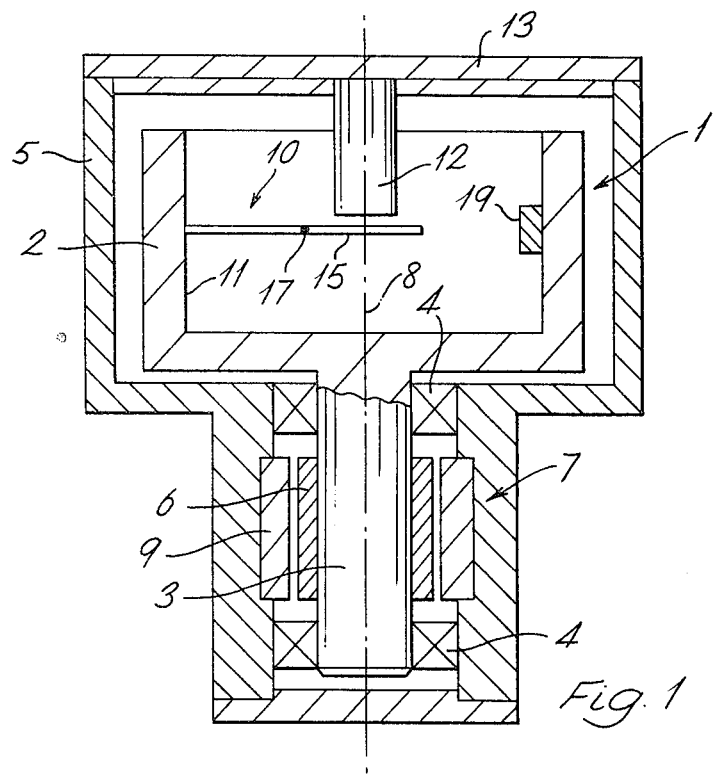
FIG. 1 is an axial section through one apparatus.
Figure 3:
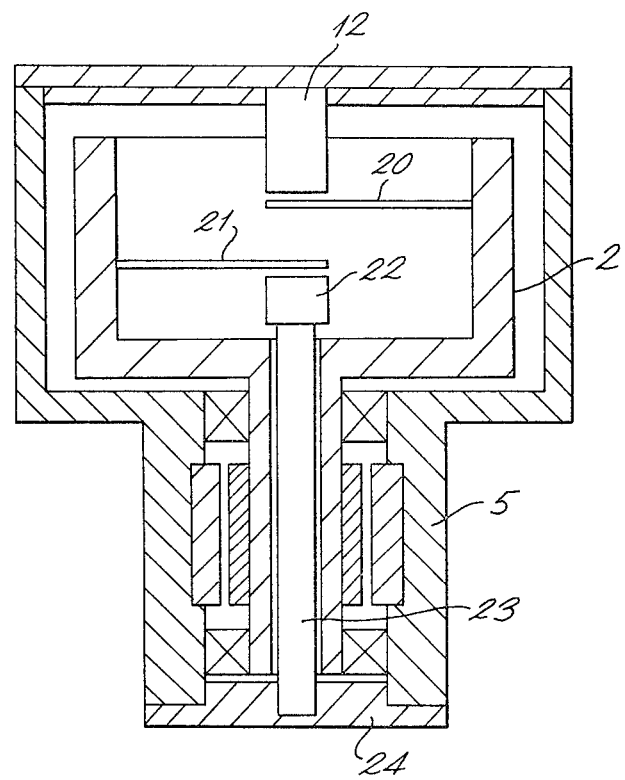
FIG. 3 is a diagrammatic axial section through an alternative apparatus.

FIGS. 1, 3 and 4 show a gyroscope comprising a drive member in the form of a rotor 1 having a cup-shaped end part 2 and a shaft 3 which rotates within bearings 4 carried by an outer housing 5. Shaft 3 also carries the rotor 6 of a synchronous electric motor 7 by which the rotor is spun about drive axis 8; the stator 9 of motor 7 is carried by housing 5. The sensitive element 10 of the gyroscope is supported from the side walls 11 of the cup part of rotor 1, and movements of this element along axis 8 are detected by a pick-off head 12, carried by a cross member 13 of housing 5, and translated into electrical signals by customary means that are not shown. The uses to which these signals may be put will be explained.

FIGS. 1 to 5 show many alternative types of sensitive element, and ways in which it may be supported from rotor 1. In FIG. 1 element 10 is a spring member in the form of an elastic beam 15, of rectangular section and of some substantial mass in itself, cantilevered to the cup 2 at 16. FIG 2a shows an alternative element of the same length, but here the sensitive element comprises both the spring member and an added mass 18 at its distal end; in this case the beam itself may be of negligible mass. FIG. 2b shows an element shorter in length than the radius of cup 2, but otherwise similar to the beam 15 of FIG. 1, and FIG. 2c shows a similar variant upon the element of FIG. 2a. In all these constructions a balancing weight 19 is fixed to the wall of cup 2, opposite to the cantilever point 16.

A further alternative is obtained by cantilevering two beams 20, 21 from diametrically opposite points on the inner wall of cup 2. Beam 20 co-operates with pick-off head 12 as beam 15 did in FIG. 1, but a second head 22 is needed for beam 21. Head 22 is mounted on a column 23 anchored in a plate 24, which is part of housing 5. Some particular advantages of this alternative will be explained shortly.

FIGS. 4 and 5 show a sensitive element comprising a mass 25, off-centre relative to axis 8 and carrying a plate 26 which co-operates with pick-off head 12. Mass 25 is attached to the cup 2 by suspension springs 27. FIG. 5a shows a suspension in which the springs 27 are disposed along three radii relative to mass 25, and FIG. 5b a system using springs all lying upon the same diameter relative to the rotor. In each case a mass 28, comparable with mass 19 of FIG. 1, balances the rotor against undesirable forces due to the eccentricity of mass 25.

Figure 2A:
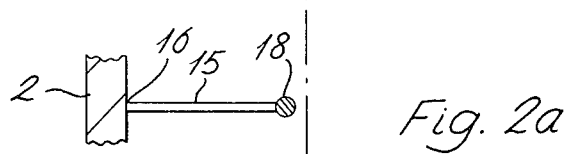
FIGS. 2a, 2b and 2c show three alternative configurations for the sensitive element of FIG. 1.
Figure 2B:
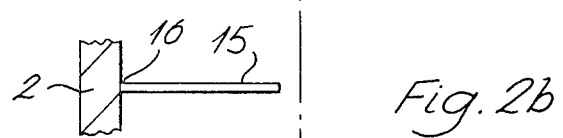
Figure 2C:
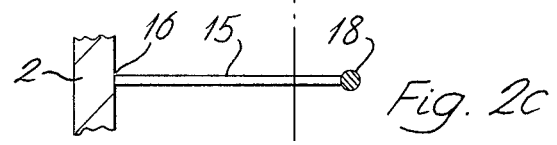

An analysis of the basic performance characteristics, now to follow, is based on particular versions of the invention as represented diagrammatically in FIGS. 6 and 7 and as already described with reference to FIGS. 2a and 2c in which the mass of the spring is negligible compared to the added mass at the distal end. Some of the basic quantities and dimensions for this anaylsis are shown in FIGS. 6 to 8. The basic characteristics to be described also apply to the alternative embodiments for which appropriate effective values of the physical parameters L, m, r, $k_o$ and $k_1$ can be defined.

Consider a set of case-fixed axes, that is to say, axes fixed relative to housing 5 (OXYZ as in FIG. 8). The origin O is fixed on the drive axis along which axis OZ lies. Axes OXYZ are initially coincident with a second set of axes Oxyz which relate to the sensitive element. These are attached to the end part 2 of rotor 1 with Oy along the undeflected radial centre line of the sensitive element. It will be seen that when the rotor has turned about OZ through an angle nt from its datum position by moving at angular velocity n for a time t, then Ox, Oy have both turned through angle nt relative to OX and OY respectively. Any deflection of the beam as a consequence may be assumed to be so small that the movement of each element of that beam is essentially along a line parallel to Oz (which is coincident with OZ) and the deflection of the beam at the drive axis may be measured by a case-fixed sensor such as pick-off 12 or 22. As FIG. 6 shows, r represents the offset between Oz and centre of mass of the sensitive element, and 1 the length of the beam spring.

In the following analysis, inputs of motion to the instrument will be expressed in terms of rotations $\phi_x$ and $\phi_y$ about axes OX and OY respectively, and the object of the instrument is to provide measures of these quantities, or of rates of turn $\dot\phi_x$ and $\dot\phi_y$, by means of the deflection of the mass in the Oyz plane.

If such rates of turn, of magnitude $u_x$ and $u_y$ respectively, are applied along the rotating axes Ox and Oy, the resulting absolute acceleration $a_z$ of the mass in direction $O_z$ is given by $$a_z = \ddot z \pm r u_x \pm n r u_y - z(u_x^2 + n^2 + u_y^2) \tag{1}$$

Where $\pm$ signs appear in this equation, the $+$ sign refers to a construction as in FIG. 6 and the $-$ sign for the construction of FIG. 7. The total external force F acting on the mass in direction Oz is due to damping and to the elastic restraint imposed by the beam, and may be expressed:

$$F = \mu \dot{z} - Kz \qquad (2)$$

where $\mu$ is the co-efficient of viscous friction and K the force per unit deflection exerted by the beam upon the mass, the beam being assumed to act as a linear spring for small z and constant n. The transverse stiffness of the spring may be expressed in the form $$K = k_0 - n^2 k_1 \qquad (3)$$

where $k_0$ and $k_1$ are constants, $k_1$ having a positive value if the spring is in compression (as in FIG. 6) but negative if the spring is in tension (FIG. 7). Under the reasonable assumption that n is much greater than $\phi_x$ and $\phi_y$, equations (1) to (3) may be combined to yield the following equation of motion:

$$m\ddot{z} + \mu\dot{z} + (k_0 - n^2 k_1)z = \mp 2\,mrn(\dot{\phi}_y \cos nt - \dot{\phi}_x \sin nt) \mp mr(\ddot{\phi}_x \cos nt + \ddot{\phi}_y \sin nt) \qquad (4)$$

Here, where $\mp$ signs appear on the right-hand side of the equation, the $-$ signs correspond to the structure of FIG. 6 and the $+$ signs to that of FIG. 7, and the remainder of this analysis will refer only to the response of a structure of the type of FIG. 6, the response of the FIG. 7 type being simple 180° out-of-phase.

The undamped natural frequency, $w_n$, of the gyro follows from equation (4) and is given by the relationship:

$$w_n^2 = \frac{(k_0 - n^2 k_1)}{m} \qquad (5)$$

Figure 9:
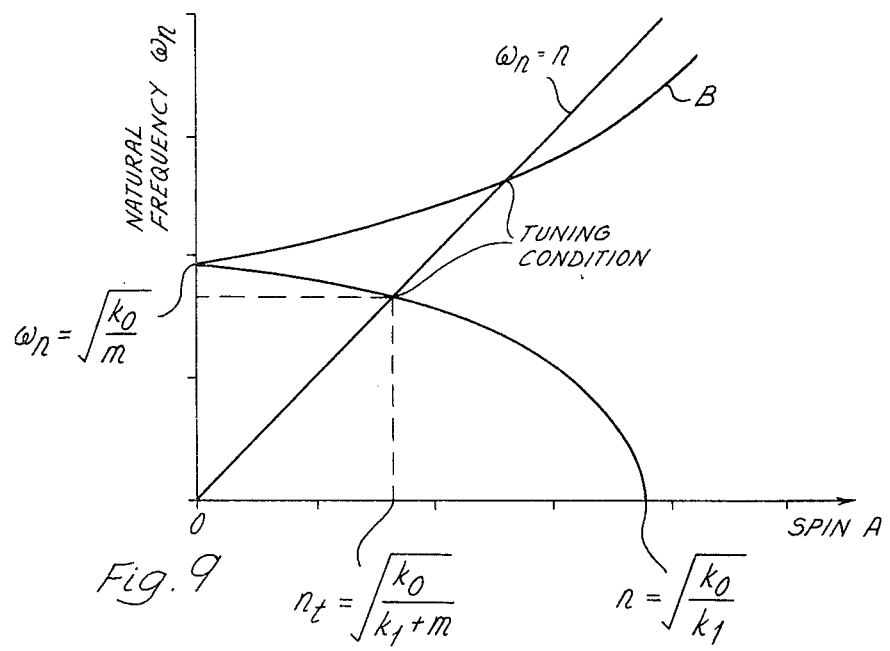
FIGS. 9 and 10 are graphs.
Figure 10:
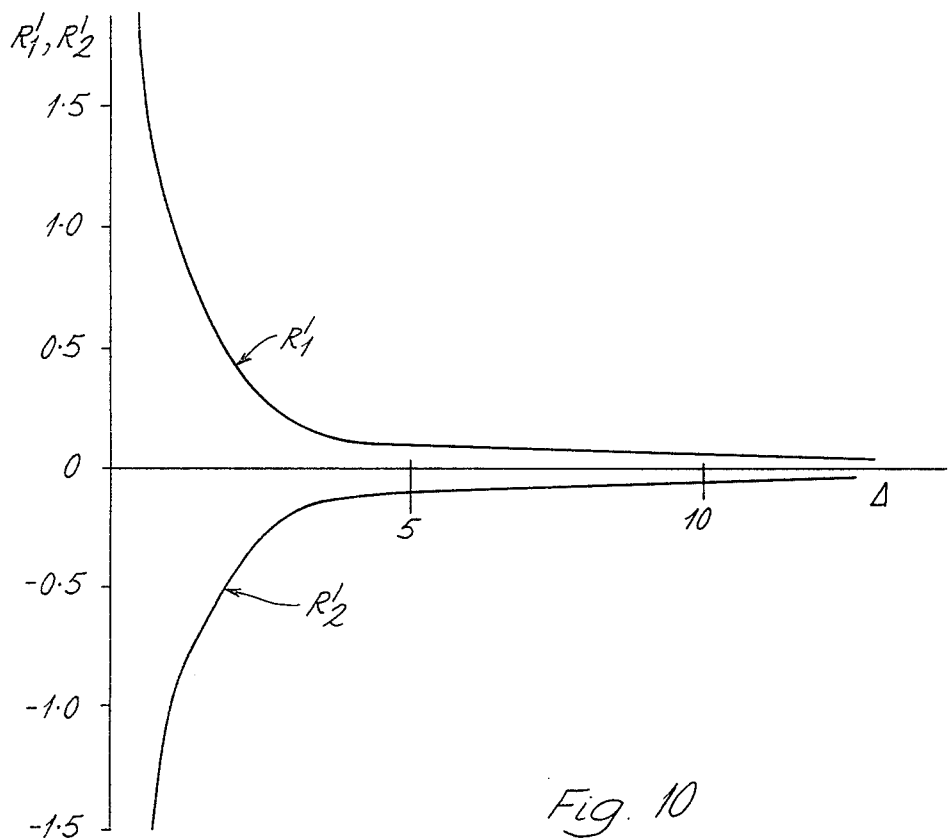

The way in which the natural frequency varies with rotor speed, n, in the range n=o to $$n \approx \sqrt{\frac{k_0}{k_1}}$$

is shown in FIG. 9. The effect of the centrifugal loading in the beam, due to the offset mass, is to reduce or increase the stiffness of the beam as n increases from zero. This means that the natural frequency of the mass on the beam changes as n increases. As indicated in FIG. 8 the gyro can be tuned by arranging for the spin frequency, n, to be equal to the natural frequency of the mass on the beam. The tuning speed is found by setting $w_n = n$ in equation (5) which yields the tuning condition:

$$n_t^2 = \frac{k_0}{(k_1 + m)} \qquad (6)$$

When the spring is in tension, $k_1$ is negative. Hence tuning is only possible if $|k_1| < m$. If now we consider the response of the gyro to a steady rate of turn $\Omega$ about an axis in the plane XY at an angle $\phi$ from OX, so that $\phi_x = \Omega \cos \phi$, $\phi_y = \Omega \sin \phi$, and $\ddot{\phi}_x = \ddot{\phi}_y = O$, then equation (4) may now be expressed in the form:

$$\ddot{Z} = 2v w_n \dot{z} + w_n^2 z = 2rn\Omega \sin (nt - \phi) \qquad (7)$$

where $v = (\mu/2mw_n)$ and $w_n^2$ is defined in equation (5). The solution to equation (7) depends on whether or not the gyro is tuned and on the magnitude of the damping which is present. Several special cases are of interest and these are outlined below.

Tuned and Undamped

If the undamped instrument is tuned according to equation (5), the general solution of the equation of motion (7) is of the form:

$$z = z_0 \sin (nt + \epsilon) - r\Omega t \cos (nt - \phi) \qquad (8)$$

where $z_o$ and $\epsilon$ are constants which are determined from initial conditions. The initial conditions at t=o are $z = O$, $\dot{z} = -r\Omega \cos \phi$ and insertion of these initial conditions in equation (8) yields $\epsilon = O$, $z_o = O$ irrespective of the value of $\phi$.
The solution is thus:

$$z = -r\Omega t \cos (nt - \phi) \qquad (9)$$

Equation (9) indicates that the response is governed entirely by the total applied turn $\Omega t$ and the instrument therefore operates as a displacement measuring device.

Furthermore, it is important to note that the instrument operates essentially as a two axis device because $\phi$, which defines the axis about which the input rate is applied, may be chosen arbitrarily. It is only necessary to provide a suitable reference signal with which to compare z and the output can be resolved into two orthogonal components relative to case-fixed axes.

Tuned and Damped

If the gyro is tuned according to equation (5) but the motion of the sensitive element is opposed by viscous friction, and the damping ratio $v$ is assumed to be very much less than unity, then the following simplified solution to the equation of motion (7) results:

$$z = \frac{r\Omega}{vn} [e^{-vnt} - 1] \cos (nt - 0) \qquad (10)$$

For very short intervals of time, such that $vnt << 1$, equation (10) may be expanded and, to first order terms in (vnt), becomes identical to equation (9) which defines the response of the undamped instrument. This means that for sufficiently small values of $v$ and of time, the response of the instrument is determined only by the total applied turn. Over longer time spans the response of the instrument is governed by a different solution to the equation of motion, giving a steady state response directly proportional to the applied rate of turn, $\Omega$, and the instrument acts as a rate of turn device. In this mode of operation the amplitude of the response to a given applied rate of turn is inversely proportional to the amount of damping present.

Untuned Undamped

In this case, assuming that the mistuning between the spin frequency and the natural frequency is small we may write $$w_n = n(1 + \eta); \eta << 1 \qquad (11)$$

and the solution to the equation of motion becomes $$z = z_0 \sin (w_n t + \epsilon) + (r\Omega/n\eta) \sin (nt - \phi) \qquad (12)$$

The second term on the right hand side of equation (12) represents a forced vibration, the amplitude of which is directly proportional to the applied rate of turn and inversely proportional to the amount of mistuning. In this condition the instrument can therefore be used to measure applied rates of turn about any axis in plane OXY.

Untuned and Damped

The response of the gyro in this case consists of a damped free vibration at frequency $p_d' = w_n\sqrt{1-v^2}$, which rapidly dies away under the effect of the damping, together with a forced vibration at frequency n. The amplitude of the forced vibration is directly proportional to the applied rate of turn. The instrument therefore acts in the damped and untuned condition as a two axis rate measuring device.

Response to Angular Vibration

In general, the steady state response to such vibration contains two frequency components (w−n) and (w+n).

For the untuned instrument ($w_n \neq n$) the vibration frequencies w which cause resonance depend on whether the instrument is being operated above or below the tuning speed. For values of spin below the tuning speed ($n < w_n$) resonance occurs for values of w in the region of ($w_n + n$) in the first component and ($w_n - n$) in the second component. For values of spin above the tuning speed ($n > w_n$) resonance occurs only in the first component for values of w in the regions ($n + w_n$) and $n - w_n$).

The case where the gyro is tuned ($w_n = n$) is of special interest. If we consider an undamped instrument, the following simplified solution of the equation of motion is obtained:

$$z = \frac{\gamma \Omega}{Zn} \{R_1^1 \cos(w-n)t + R_2^1 \cos(w+n)t\}$$

where $$R_1^1 = [z-\Delta]/[1-(\Delta-1)^2]$$

$$R_2^1 = [z+\Delta]/[1-(\Delta+1)^2] \text{ and}$$

$$\Delta = w/n \quad (13)$$

The way in which $R_1$ and $R_2$ vary with $\Delta$ is shown in FIG. (10).

When $\Delta \to 0$, i.e. $w \to 0$, resonance occurs in both the first and second components of output. This corresponds to the case of a steady applied rate of turn. When $\Delta \to 2$, i.e. $w \to 0$ the denominator of $R_1$ in equation (13) tends to zero. At the same time however, the numerator also tends to zero. Consequently the expression for $R_1$ given in equation (13) is indeterminate when $\Delta = 2$. The value to which $R_1$ tends as $\Delta \to 2$ is found by applying L'Hopital's rule which gives $$R_1^1 = \frac{1}{2}[\Delta-1] = \frac{1}{2}(\Delta=2) \quad (14)$$

This result is of considerable practical significance. It shows that the tuned instrument does not resonate when w=2n. The tuned instrument is therefore inherently immune to 2n angular vibration to which some other known dynamically tune gyroscopes are notoriously susceptible.

A tuned instrument in the form considered here has favourable frequency response characteristics, since the gyro does not resonate in the presence of angular vibration, except in the limiting case where the angular vibration has zero frequency which corresponds to a steady applied rate of turn.

Response to Applied Acceleration

Because the sensitive element of the instrument is essentially pendular, any applied acceleration along the spin axis will produce a displacement of the sensitive element, and the steady state response to steady applied acceleration is a steady offset in z which is directly proportional to the applied acceleration and the nature of the response is independent of the states of tuning and damping. The instrument can therefore act both as a linear and as an angular rate sensor.

Discrimination between outputs due to constant linear acceleration and outputs due to applied rates of turn is straight-forward since the former input results in a steady deflection of the sensitive element while the latter input produces a vibratory motion at the spin frequency.

If a linear vibration at frequency w is applied it may be shown that resonance will occur for values of w in the neighbourhood of $w_n$ whatever the conditions of tuning and damping. The case of a tuned undamped gyro in the presence of applied vibration at the spin frequency is of special interest, and here it may be shown that a linear vibration at the spin frequency will produce a response in the tuned undamped instrument which is indistinguishable from the output produced by a steady applied rate of turn. This means that a linear vibratory input could be interpreted as a constant rate of turn. This problem can be overcome however by the instrument of FIG. 3, having a second sensitive element mounted diametrically opposite the first one. The response of this second sensitive element to any applied rate of turn would be displaced by 180° from the response of the first element, but the responses of the two elements due to linear vibration would be in phase. Therefore, the difference in the responses of the two elements provides a measure of applied angular rates or displacement and the effect of applied linear accelerations is eliminated. Conversely, the sum of the responses provides a measure of the applied acceleration and the effect of applied rotations is eliminated.

In summary, the natural frequency of the gyro has been shown to be a function of the spin rate. This allows the instrument to be tuned so that the natural frequency is equal to the spin frequency. In the tuned condition the response of the gyro to a steady applied rate is determined by the degree of damping present. If the gyro is undamped the instrument responds as a displacement measuring device. In the presence of light damping the gyro responds as a displacement measuring device for short intervals of time, and as a rate measuring device as the intervals increase. In the untuned condition the instrument responds as a rate measuring device irrespective of the conditions of damping. The operation of the instrument in all these above cases is essentially two-axes.

The response of the untuned instrument to applied angular vibration contains two components at frequencies equal to the sum and difference of the spin and input frequencies. Two resonances occur as the input frequency is varied. In the tuned condition resonance does not occur, other than when a steady rate of turn is applied, in which case the resonant behaviour of the instrument is exploited to give a displacement measuring device. The tuned instrument therefore presents the prospect of favourable frequency response characteristics in the presence of angular vibration.

The instrument has also been shown to be capable of measuring constant applied accelerations along the spin axis in addition to acting as an angular rate or displacement sensor, the acceleration-measuring capability being independent of the conditions of tuning and damping.

We claim:

1. Gyroscopic apparatus including:
a drive member, adapted to rotate about a drive axis;
a sensitive element attached to said drive member,
said sensitive element comprising a sprung mass system including spring members and having its centre of mass offset from said drive axis, said spring members extending away from the points of said attachment of said sprung mass system to said drive member in directions having a radially-inwards component relative to said drive axis and being free to permit vibration of said element in a direction parallel to said drive axis, and
means to detect said vibration and convert it to gyroscopically-useful signals.

2. Gyroscopic apparatus according to claim 1 in which said spring members are supported as cantilevers from said drive member, and in which the fixed and free ends of said cantilevers lie to opposite sides of said drive axis.

3. Gyroscopic apparatus according to claim 1 in which said spring members are supported as cantilevers from said drive member, and in which the fixed and free ends of said cantilevers lie to the same side of said drive axis.

4. Gyroscopic apparatus according to claim 1 in which said mass of said sprung mass system is that of said spring members themselves.

5. Gyroscopic apparatus according to claim 1 in which said spring members carry added masses.

6. Gyroscopic apparatus according to claim 5 in which said spring members are light so that substantially the whole of said mass of said sprung mass system is due to said added masses.

7. Gyroscopic apparatus according to claim 1 in which said drive member is balanced by carrying masses at points which, relative to said drive axis, lie diametrically opposite to points of said attachment of said sensitive element to said drive member.

8. Gyroscopic apparatus according to claim 1 in which said sensitive element mass system is attached to said drive member at a plurality of peripheral points, so that said centre of mass of said sprung mass system lies within said periphery.

9. Gyroscopic apparatus according to claim 1 in which said sensitive element comprises a mass connected to said drive member by said spring members extending in opposite radial directions relative to said drive axis.

* * * * *

UNITED STATES PATENT AND TRADEMARK OFFICE
CERTIFICATE OF CORRECTION

PATENT NO. : 4,258,577
DATED : March 31, 1981
INVENTOR(S) : Colin H. J. Fox, James S. Burdess It is certified that error appears in the above—identified patent and that said Letters Patent is hereby corrected as shown below:

Column 2, line 61, change "$ru_x$" to --$r\dot{u}_x$--.

Signed and Sealed this

Fifteenth Day of September 1981

[SEAL]

Attest:

GERALD J. MOSSINGHOFF

Attesting Officer     Commissioner of Patents and Trademarks